US008104097B2

(12) United States Patent
Hamann

(10) Patent No.: US 8,104,097 B2
(45) Date of Patent: Jan. 31, 2012

(54) MULTICOLOR, MULTILAYER ELASTOMERIC ARTICLES AND METHODS OF MANUFACTURING SAME

(75) Inventor: Curtis P. Hamann, Paradise Valley, AZ (US)

(73) Assignee: SmartHealth, Inc., Phoenix, AZ (US)

( * ) Notice: Subject to any disclaimer, the term of this patent is extended or adjusted under 35 U.S.C. 154(b) by 1638 days.

(21) Appl. No.: 11/271,005

(22) Filed: Nov. 10, 2005

(65) Prior Publication Data

US 2007/0104904 A1    May 10, 2007

(51) Int. Cl.
*A41D 19/00* (2006.01)
(52) U.S. Cl. ............. 2/159; 2/164; 2/167; 2/168; 2/169; 264/45.1; 264/45.3; 264/304; 264/305; 264/306; 264/338
(58) Field of Classification Search .................... 2/161.7, 2/168, 161, 164, 167, 169; 428/35.7, 36.8, 428/36.4; 264/304, 305, 306, 338, 45.1, 264/45.3
See application file for complete search history.

(56) References Cited

U.S. PATENT DOCUMENTS

| | | | | | |
|---|---|---|---|---|---|
| 1,940,315 | A | * | 12/1933 | McKay | 427/270 |
| 2,747,229 | A | * | 5/1956 | Teague | 264/257 |
| 3,286,011 | A | * | 11/1966 | Kavalir et al. | 264/306 |
| 3,852,826 | A | | 12/1974 | Schindler | |
| 3,872,515 | A | * | 3/1975 | Miner et al. | 2/168 |
| 3,994,643 | A | * | 11/1976 | Joslin et al. | 425/110 |
| 4,519,098 | A | * | 5/1985 | Dunmire et al. | 2/161.8 |
| 5,180,605 | A | * | 1/1993 | Milner | 427/2.3 |
| 5,421,033 | A | | 6/1995 | DeLeo | |
| 5,467,481 | A | | 11/1995 | Srivastava | |
| 5,524,294 | A | | 6/1996 | Richardson et al. | |
| 2004/0091504 | A1 | | 5/2004 | Hamann | |
| 2004/0091557 | A1 | | 5/2004 | Hamann | |
| 2005/0037054 | A1 | | 2/2005 | Hamann | |
| 2005/0060787 | A1 | | 3/2005 | Cheng | |

FOREIGN PATENT DOCUMENTS

GB    2208348 A    3/1989

OTHER PUBLICATIONS

Encarta definition of Bonding, http://encarta.msn.com/dictionary_/bonding.html, Sep. 29, 2008.*
Encarta definition of Contiguous, http://encarta.msn.com/dictionary_/contiguous.html, Sep. 29, 2008.*
U.S. Appl. No. 11/138,193, filed May 26, 2005, Hamann.

* cited by examiner

*Primary Examiner* — Angela Ortiz
*Assistant Examiner* — Michael Nelson
(74) *Attorney, Agent, or Firm* — Reinhart Boerner Van Deuren P.C.

(57) ABSTRACT

Multilayer elastomeric articles and methods of making the same are disclosed in which the outside or outer distal surface of the article is a different color or otherwise visually distinct in appearance from the inside or wearer contacting surface of the article so that the user of the article can readily identify the article as a multilayer elastomeric article. In one aspect, elastomer emulsions, solvent solutions, or plastisols used to form each layer may be modified with the addition of base color and/or colorant components in order to form a colored or patterned layer. In another aspect, one or both of the surfaces of the elastomeric articles (or layers of the articles) may be coated with such a colorant component to sufficiently visually distinguish the layers from each other.

13 Claims, 3 Drawing Sheets

MULTICOLOR, MULTILAYER ELASTOMERIC ARTICLES AND METHODS OF MANUFACTURING SAME

BACKGROUND OF THE INVENTION

Field of the Invention

The present invention relates generally to elastomeric articles. More particularly, the present invention relates to multicolored, multilayered elastomeric articles and methods of making the same.

For the purposes of the present invention, elastomer articles include, but are not limited to, gloves and other multilayer, dipped elastomeric articles, such as elastomer sheets, or condoms.

Disposable gloves are widely used by members of the medical community, the scientific community, and the industrial community to protect the wearer from chemical exposure, mechanical abrasion, environmental hazards, biohazard contamination and to prevent transmission of disease or contaminants. Health care providers frequently wear disposable gloves while performing surgery or other medical or dental procedures such as patient examinations; thus, the gloves are often also referred to as disposable examination gloves or disposable surgical gloves. The disposable gloves are impermeable to biological fluids, tissues and solids produced by the body or other contaminants (human or animal), advantageously protecting the wearer from fomitic (transmission by objects that harbor pathogenic organisms) transmission of pathogens and disease.

Also, disposable gloves are worn by individuals who wish to protect their hands from various chemicals, materials and objects which may irritate, damage or dry out the user's skin and which may be harmful or potentially harmful if allowed to contact or permeate the dermal barrier. These gloves may be worn in the occupational setting by scientists, cleaning service workers, food handlers, law enforcement workers, beauticians or other workers having special protection needs. Thus, disposable gloves may also be referred to as protective gloves, food handling gloves or industrial gloves.

It is desirable that the gloves (disposable and/or reusable) provide the necessary protection, are durable, flexible, do not cause irritation or allergy problems to those in contact with the article, are not tacky, are easy to don, and are comfortable to wear. Many of these desirable characteristics are achieved by the inventions described in U.S. patent application Ser. Nos. 10/373,970 and 10/373,985, filed Feb. 25, 2003, by Curtis P. Hamann and entitled "Flexible elastomer articles and methods of manufacturing", and in U.S. patent application Ser. No. 10/640,192, filed on Aug. 13, 2003, by Curtis P. Hamann and entitled "Gloves containing dry powdered aloe and method of manufacturing". These applications are assigned to SmartHealth, Inc., d/b/a SmartPractice®, the assignee of the present application. The details of these applications are incorporated by reference herein.

As is known in the art, disposable gloves are thin and flexible and are manufactured from a variety of polymeric materials herein throughout referred to as "elastomer(s)" or "elastomer material(s)" or "raw material(s)". These elastomers may be considered a natural rubber as with natural rubber latex (NRL) or a synthetic rubber, or a plastic and include, but are not limited to, a synthetic polyisoprene, a chloroprene (including Neoprene-homopolymer of the conjugated diene chloroprene), a polyurethane (PU), a polyvinyl chloride (PVC), a styrene butadiene styrene (SBS), a styrene isoprene styrene (SIS), a silicone, a butadiene methylmethacrylate, an acrylonitrile, a styrene ethylene butylene styrene (SEBS), an acrylate-based hydrogel, any other elastomer that can be suspended into an emulsion, any other elastomer or combination of elastomers that are suspendable, soluble or miscible in a solution or plastisol, and combinations thereof.

Various methods of making flexible elastomer gloves and similar articles are known in the art. In a typical method for making such articles a liquid polymer emulsion, e.g., a blended NRL emulsion, is coagulated on the surface of a porcelain hand shaped former (in the case of glove manufacture) by a process known in the art as "dipping" (other flexible articles may be produced by dipping, molding or extrusion). Depositing the NRL emulsion evenly on the surface of the former is accomplished by pre-treating the former with a chemical coagulant (typically calcium nitrate or similar salt). The coagulant is applied to the former by dipping and is then oven dried. This pretreated former then is dipped into the liquid NRL emulsion tank. The presence of the coagulant on the surface of the former initiates coagulation of the NRL emulsion. As the former is removed from the NRL dip tank emulsion, the coagulation is not 100% complete. The non coagulated NRL begins to flow due to gravitational forces. For this reason most manufacturing processes and machines are designed so the former immediately begins rotating on an axis parallel to the length of the former and completes a 90 to 180 degree rotation from the base of the former before entering vulcanization ovens. (Multiple polymer layers may be formed on the former in this manner.) After the glove is vulcanized it is stripped from the former. The surface of the glove that was against the former during the manufacturing process is now the outer/distal surface of the completed glove.

During the dipping process, pinhole defects are created in a small percentage of the finished product. The Food and Drug Administration (FDA) glove standards acknowledge this by accepting an ASTM standard which allows a pinhole containing product to be shipped to healthcare users. The most common cause of pinholes are air bubbles, former debri or defect, former morphology and knocking. A second dip (i.e. the addition of a second layer of elastomer) is designed to close the defect in the first layer to minimize the chance of a breach when the glove is worn. The probability of a second air bubble being deposited in the identical location on the glove during the second dip is statistically infinitely remote, as such, the pinhole defect in one layer does not travel through to the second layer, and therefore does not interfere with the barrier/protective function of the glove.

Failure during use of gloves results from the propagation of a tear initiated from a surface defect. These defects can be the surface manufacturing defects, subsequent oxidative damage to the elastomer surface (caused by ozone exposure, ultra violet light and/or over chlorination) or caused by mechanical damage in use (needle, scalpel, bone or tooth fragment, burr etc.). A double dipped glove provides the added benefit of interrupting the propagation of a tear because the continuity of the polymer is interrupted as if you were wearing two pairs of gloves. As a result, the probability of a tear jumping from the first layer to the second layer is reduced—providing additional barrier protection.

In addition, for added safety, and depending on the particular end-use application of the glove, multilayer gloves may be made of two distinct materials, having different chemical permeability properties and/or physical properties (such as a layer of latex rubber and a layer of nitrile).

Typically, multilayer gloves are constructed from two or more layers of elastomeric material of the same color (even where different elastomeric materials are used). However, when each layer of the glove is the same color, the user cannot visually and/or readily determine that the glove in fact has two layers (and therefore has a significantly reduced possibility of pinhole leaks that extend completely through the glove and/or otherwise compromise the integrity of the glove).

Indeed, many times in surgery, clinicians do not read the glove package and/or the gloves have been removed from the package—thus, when the gloves are only one color, the surgeon or the nurse cannot immediately recognize whether the glove is in fact a multilayered glove or whether the glove has pinhole leaks or other defects.

Accordingly, it is a primary objective of the present invention to provide a multicolor, multilayered elastomer article, preferably, a two-layer double-dipped glove for medical/dental and other uses, in which at least one of the layers is a different or distinct color from that of the other layer. It is a related objective of the present invention to provide a multilayer glove in which the distal surface and the wearer-contacting surface are of different colors and/or provide a different, contrasting visual appearance to the user. The resulting glove or other article being easily recognized by the user as a two layer or multilayer glove—the risks associated with pinhole defects in such gloves being minimized.

It is a further objective of the present invention to provide a colored, multilayer elastomeric article wherein at least one of the layers of the article is a different color from the remaining layers—facilitating the ability of the user to visually inspect the article for larger defects in the article layers before use of the article. It is a related objective of the present invention to provide a two-layer, breach-indicating glove having a first elastomeric layer of one color and a second elastomeric layer of a contrasting and/or distinct color from the first layer—providing the user with a visual signal when one of the layers is breached, torn or otherwise compromised after use.

A multicolor, multilayer elastomer article in accordance with the present invention preferably may be manufactured without requiring substantial modification to existing manufacturing methods for such articles. Also, multicolored, multilayer elastomer articles in accordance with the present invention should retain all of the desirable functional characteristics of the single-colored/uniformly colored, multilayer articles.

SUMMARY OF THE INVENTION

The disadvantages and limitations of the background art discussed above are overcome by the present invention. With this invention, a multilayered, preferably two-layered, glove is disclosed having an outside surface (distal surface or outer distal surface or outermost surface) having a first visual appearance, color, and/or pattern and an inside or wearer contacting surface having a second visual appearance, color and/or pattern that is sufficiently visually distinct from the first color or pattern to permit the user of the article to readily identify the article as a multilayer article.

The present invention is preferably directed to gloves, but can encompasses any type of flexible, semi-rigid and/or rigid dipped elastomeric article known to those skilled in the art including, for example, condoms.

Accordingly, the preferred embodiment of the present invention includes a bilaminar glove or elastomeric article that is readily identifiable to the human eye as a two layer or double-dipped article. The glove includes a first elastomeric layer manufactured of a first color or pattern and a second elastomeric layer physically and/or otherwise bonded to the first layer, manufactured of a second color or pattern. The first and second colors or patterns are selected such that the outside surface (OS) and the wearer contacting surface (WCS) of the article are visually distinct or readily distinguishable from each other.

Each layer of the glove can be constructed of any elastomeric material known to those skilled in the art. As such, each layer of the article may be manufactured of the same elastomeric material(s) and/or can be constructed of different elastomeric material(s)—depending on the given end-use application of the article and/or the particular colorant or coloring agent used, as will be well known to those skilled in the art.

Indeed, depending on the given application, the elastomeric material selected for a given layer can depend on the particular chemical permeability and/or sensitivity properties of the elastomeric material, the environmental sensitivity (i.e. oxidative stability, ozone, UV, temperature and humidity) and/or the physical properties of the elastomeric material (tear and/or puncture strength).

The particular color, colors and/or patterns of the layers of the elastomeric gloves of the present invention can be any such color or pattern known to those skilled in the art, and therefore, can be selected based on the specific industry and/or regulatory standards for the type of elastomeric material utilized; the type of coatings and/or donnability enhancing agents utilized within the matrix; the type of intended use for the article (i.e. medical, chemical); the type or location of the surface of the particular layer of the article; and/or as a matter of design choice.

Accordingly, the layers can be any color, colors or patterns known to those skilled in the art, provided the outermost layer and therefore, the outside surface (OS) of the article is sufficiently visually distinct (e.g. is a different color) from the innermost layer, and therefore, the wearer contacting surface (WCS) of the article. Accordingly, the distinct layers permit the prospective user to readily determine that the article is a double dipped/multilayered glove, and therefore, has a significantly reduced possibility of pinhole leaks that extend completely through the glove, is less likely to fail as a result of environmental damage and/or oxidation during transport and storage and/or is less likely to be compromised during use by surface defects and/or nicks.

Accordingly, in certain embodiments, the present invention can include, in part, a multilayer elastomeric article having an innermost layer, at least one intervening/middle layer contiguously bonded to the innermost layer and an outmost layer contiguously bonded to the middle layer, wherein the outermost layer has a visual appearance different from the visual appearance of innermost layer such that the visible distinction between the visual appearance of the outermost layer and the visual appearance of innermost layer is easily recognizable to the human eye.

In addition, the present invention provides in part, a colored, multilayer elastomeric article wherein at least one elastomeric layer of the article comprises a different color and/or distinct visual appearance than at least one of the remaining elastomeric layers of the article. Such multilayer elastomeric article preferably comprises an outside surface (distal surface or outer distal surface or outermost surface) that is visually distinct in appearance, color and/or pattern to readily indicate the article as a multilayer article.

Accordingly, the present invention includes a bilaminar article that is readily identifiable to the human eye as a multilayer article, the article includes a first elastomeric layer manufactured of a first color or pattern and a second elastomeric layer, bonded immediately adjacent to the first layer, manufactured of a second color or pattern, the first and second colors or patterns selected such that the outside surface (OS)

and the wearer contacting surface (WCS) of the article are visually distinct or readily distinguishable from each other.

In part, the present invention includes forming a two-layer, colored elastomeric glove to ensure ready identification of the glove as a two-layer glove. The method can include (1) providing a first elastomeric layer having a first visual appearance; and (2) providing an a second layer having a second visually distinct appearance contiguously bonded (i.e. by virtue of the dipping/manufacturing process) to the first layer about its entire surface area, wherein the visual appearance of the second layer is sufficiently visually distinct from the visual appearance of first layer to permit identification of the glove as a two-layer glove.

Accordingly, in part, the present invention can provide a breach-indicating, multilayer elastomeric article wherein the outside surface (distal surface or outer distal surface or outermost surface) of the article is constructed of a first color and/or pattern and the inside or wearer contacting surface of the article is constructed of a second color and/or pattern that is sufficiently visually distinct from the first color or pattern such that the second color or pattern can be easily seen through a hole in the outermost surface of the article and, as such, can be readily noticed by the user of the glove permitting identification of a ruptured or compromised elastomeric layer and/or glove by the user of the article.

Other advantages and features of the invention, together with the organization and manner of operation thereof, will become apparent from the following detailed description when taken in conjunction with the accompanying drawings. It is expressly understood that the drawings are for the purpose of illustration and description only, and are not intended as a definition of the limits of the invention.

The elastomeric articles of the present invention are of a construction which is both durable and long lasting, and which will require little or no maintenance to be provided by the user throughout its operating lifetime. The elastomeric articles of the present invention are also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

This invention relates to multicolor, multilayer elastomeric articles, and in particular to two-layer, two-color disposable gloves and methods of making the same. In particular, the present invention relates to disposable gloves. However, other dipped elastomeric articles, such as condoms, may be included within the multilayer elastomeric articles of the present invention.

Figure 1:
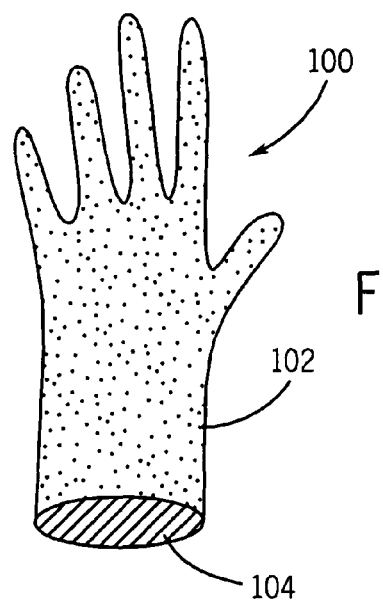
FIG. 1 is a perspective view of a glove showing an outer surface thereof and an inner or wearer contacting surface thereof.

An exemplary elastomeric article, a glove 100, in accordance with the present invention, is illustrated in FIG. 1. The multilayer glove 100 includes an outside surface (distal surface or outer distal surface or outermost surface) (OS) 102 and an inside or wearer contacting surface (WCS) 104. It will be appreciated by those skilled in the art, for purposes of the following discussion, the glove 100 may be a bilaminar glove (two layers) or a multilayer glove wherein the exterior appearance of the glove 100 is substantially similar to that shown in FIG. 1, having an outside surface (OS) 102 and wearer contacting surface (WCS) 104.

As illustrated in FIG. 1, preferably and consistent with the teachings of the present invention, the exterior or outside surface (OS) 102 of the multilayer glove 100 is manufactured to have an appearance that is visually distinct (i.e. is a different color) and/or bears distinguishing visual markings and/or characteristics from the interior or wearer contacting surface (WCS) 104.

Figure 2:
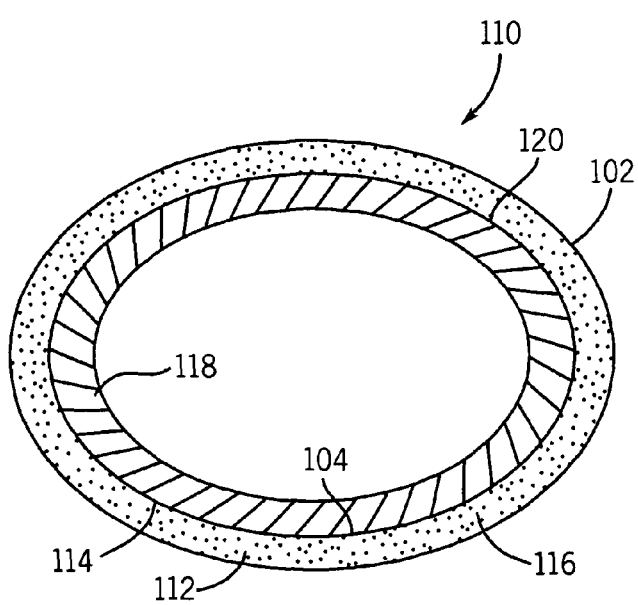
FIG. 2 is a cross sectional view of a portion of a bilaminar glove in which each layer is manufactured to have a different visual appearance from the other layer.

Turning next to FIG. 2, a cross section of a preferred bilaminar glove 110 having a first layer 112 and a second layer 114 is shown. The first layer 112 forms an exterior layer of the glove 110 and has an OS 102. The second layer 114 forms an interior layer of glove 110, having a WCS 104. It will be appreciated that the glove 110 has an exterior appearance similar to the glove 100 shown in FIG. 1. The layers 112 and 114 of the bilaminar glove 110 are immediately adjacent and are substantially completely bonded to each other about the entire surface area 113 of the glove, in a manner well known to those skilled in the art. (For example, there is no space and/or air present between the layers 112 and 114 of the multilayer glove 110).

As illustrated in FIG. 2, the glove 110 is manufactured such that the first and second layers 112 and 114 of the glove 110 are different colors and/or are otherwise visually distinct from each other. For example, the outside surface (OS) 102 of the glove 110 can be a first color or pattern 116 and the inside surface or wearer contacting surface (WCS) 104 of the glove 110 can be a second color or pattern 116, such that the first color or pattern 116 is sufficiently visually distinguishable from the second color or pattern 118 to permit the user to identify the glove 110 as a bilaminar glove.

Accordingly, the first and second colors or patterns 116 and 118 of the layers 112 and 114, respectively, can be any color or pattern known to those skilled in the art, provided each of the layers 112 and 114 of the glove 110 comprise different colors and/or are otherwise visually distinct or readily distinguishable from each other in appearance. For example, the first layer 112, and therefore, the outside surface (OS) 102 of the glove 110 can be blue and the second layer 114, and therefore, the wearer contacting surface (WCS) 104 of the glove 110 can be white—permitting the prospective user to readily determine that the glove 110 is a bilaminar glove (as shown, for example, in FIG. 1).

Figure 3:
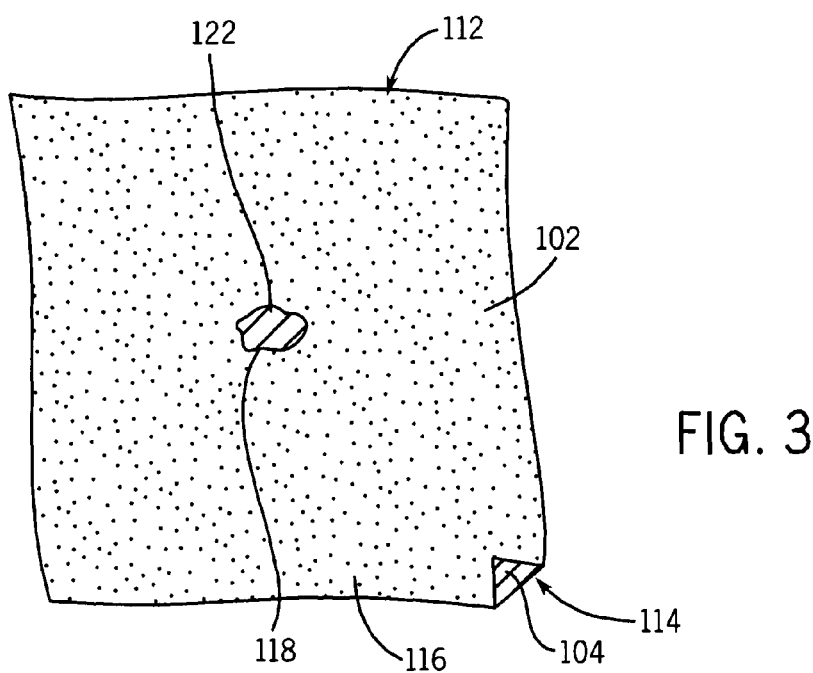
FIG. 3 is a partial view of a portion of the bilaminar glove illustrated in FIG. 2, showing the color of the inside layer through the leak in the outside layer.

Further, as best illustrated in FIG. 3, if a pinhole leak, nick, tear or other hole 122 occurs in one of the layers, such as in the first layer 112 (as shown in FIG. 3), the second layer 114 remains intact (i.e. reduced likelihood of tear propagation and/or a pinhole located in exactly the same location causing a small channel or tunnel through the entire glove).

Where the hole 122 is sufficiently large, the second color or pattern 118 of the second layer 114 can be seen through the hole 122. Accordingly, because the second color or pattern 118 appears different and/or can be readily distinguished from the first color or pattern 116, the hole 122 may be noticed by the user of the glove. Thus, consistent with the broader aspects of the present invention, the distinct and/or distinguishable colors or patterns 116 and 118 of the layers 112 and 114, respectively, can provide the present invention with a breach-indicating function that permits identification of a ruptured or compromised elastomeric layer and/or glove by the user of the article.

It will be appreciated by those skilled in the art that the first and the second layers 112 and 114 of the glove 110 can include more than one color and/or can comprise a colored pattern, indicia or other markings, provided each of the layers 112 and 114 of the glove 110 and/or the outside surface (OS) 102 and the wearer contacting surface (WCS) 104 of the glove 110 are sufficiently visually distinct or readily distinguishable from each other. For example, each of layers 112 and 114 may be formed of one or more base colors with one or more colors coated or printed on the surface(s) of the layer to provide patterns, designs and/or markings visually distinguishing the first layer 112 from the second layer 114.

In addition, each of the layers 112 and 114 may further or alternatively include colored indicia and/or bear texturized patterns, markings, designs, slogans or any other visually detectable, distinguishable characteristic on one or both of its respective surfaces to readily distinguish the glove 110 as a multilayer glove. For example, colored indicia (such as the glove size) and/or texturized patterns may be applied and/or included on the wearer contacting surface (WCS) 104 of the glove 110, the outside surface (OS) 102 of the glove 110 or at the interface 120 between the first and second layers 112 and 114.

The colorant material/component used to manufacture the different and/or distinguishable colors or patterns 116 and 118 of the layers 112 and 114, respectively, may be any coloring agent known to those skilled in the art. Such colorant materials can include, but are not limited to, products supplied by, but not restricted to, those from Clariant GmbH. Examples include COLANYL® Green GG131, COLANYL® Violet RL130, FLEXONYL® Yellow DGR/LA, COLANYL® Red E3B 130, COLANYL® Black N131 and COLANYL® Blue A2R 130. Equivalent or similar colorant products from other suppliers also may be used.

In certain embodiments, the colorant component can be selected to maximize the color and/or visual contrast between the layers of the multilayered article. In certain other embodiments, the color of each of the layers can be selected to: correspond with industry and/or regulatory standards for the type of elastomeric material utilized; the type of intended use for the article; the type of coatings and/or donnability enhancing agents utilized within the matrix and/or on the surface of the particular layer of the glove; and/or as a matter of design choice.

The colorant component/material selected and used in the present invention is in a quantity sufficient in the finished article to maintain, and to not fall outside the physical requirements of the ASTM and ISO standards for the particular flexible article made (such as, but not limited to all physical requirement tables, ASTM D 3577-01a$^{\epsilon 2}$-Table 3, ASTM D 5250-00$^{\epsilon 4}$-Table 3, ASTM D 6319-00a$^{\epsilon 3}$-Table 3, ISO 11193:1994(E)-Table 3, ISO 10282: 1994(E)-Table 3, ASTM D 3578-01a$^{\epsilon 2}$-Table 1, and ASTM D 4679-02-Table 3.

Thus, a concentration of colorant component/coloring agent in the flexible article of the present invention can be in any amount sufficient to optimize benefits (i.e. to maximize the visual contrast between the layers of the article) without compromising the physical properties (physical requirements and/or performance requirements) required by the applicable ASTM and/or ISO specifications, and/or other known standards, such as those for tensile strength, modulus, ultimate elongation and/or for freedom from holes, physical dimensions, powder-free residue, protein content and powder amount, as will be well known to those skilled in the art.

The elastomer used in the glove 110 can be prepared as a compounded elastomer and may be an elastomer suspended into an emulsion, or an elastomer that is soluble or miscible in a solvent or plastisol, and combinations thereof. Where the elastomer is an elastomer that is suspended into an emulsion, the elastomer can be one or more components selected from the group consisting of a natural rubber latex (originating from either *Havea brasiliensis* and/or guayule (*Parthenium argentatum*)), a synthetic polyisoprene, a chloroprene (Neoprene), a polyurethane, an acrylonitrile, a butadiene methylmethacrylate, a styrene butadiene styrene, a styrene isoprene styrene, a styrene ethylene butylene styrene, a silicone, and an acrylate-based hydrogel, any other elastomer that can be suspended into an emulsion, and mixtures thereof. Where the elastomer is an elastomer that is soluble or miscible in a solvent or plastisol, the elastomer can be one or more components selected from the group consisting of a silicone, a polyurethane, an acrylate-based hydrogel, any other solvent or plastisol soluble elastomer, any other solvent or plastisol miscible elastomer, and mixtures thereof.

It will be readily apparent to those skilled in the art that the layers 112 and 114 can be constructed of the same elastomeric material and/or can be constructed of different elastomeric materials—depending on the given end-use application of the glove 110 and including such factors as the particular chemical permeability and/or sensitivity properties of the elastomeric material, the environmental sensitivity (i.e. oxidative stability, ozone, UV, temperature and humidity) of the material to be used for the layer and/or the physical properties of the elastomeric material (tear and/or puncture strength).

Further, consistent with the broader aspects of the present invention, one or more of the layers of the multicolored, multilayered articles of the present invention may include additional components incorporated into the elastomeric emulsion/matrix of the material from which the article is made and/or be coated on the surface of one of the layers of the article. For example, a flavoring component and/or a botanical component may be included in one or more of the layers of the multilayer article of the present invention, (such as xylitol as described in more detail in U.S. patent application Ser. No. 11/138,193 entitled "Flavored Elastomeric Articles and Methods of Manufacturing Same"; and/or such as Aloe extract and/or Nopal extract as described in more detail in U.S. patent application Ser. Nos. 10/373,970 and 10/373,985, entitled "Flexible elastomer articles and methods of manufacturing", and in U.S. patent application Ser. No. 10/640,192, entitled "Gloves containing dry powdered aloe and method of manufacturing", each of which are incorporated herein by reference).

Further, consistent with the broader aspects of the present invention, one or more of the layers of the multicolored, multilayered articles of the present invention may include one or more therapeutic components having one or more of the qualities of wound healing, anti-inflammatory properties, anti-microbial properties, analgesic properties, and anti-aging properties, as will also be appreciated by those skilled in the art.

Figure 4:
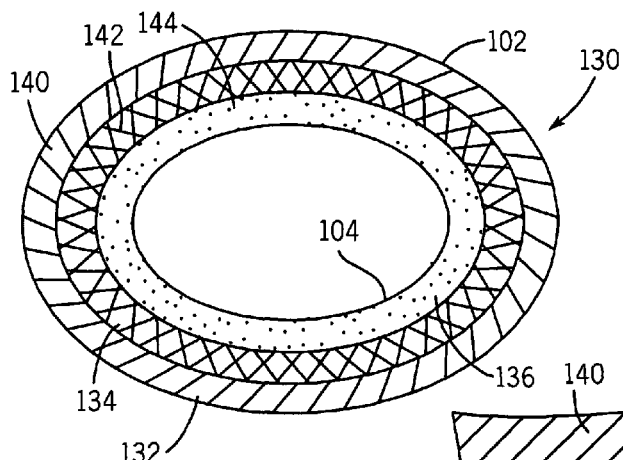
FIG. 4 is a cross sectional view of a portion of a multilayer glove in which each layer of the multilayer glove comprises a different color or pattern.

Turning next to FIG. 4, a cross section of a multilayer glove 130 of the present invention is illustrated. The glove 130 has an outermost layer 132; a middle layer 134 and an innermost layer 136. It will be appreciated that the multilayer glove 130 has an exterior appearance similar to glove 100 (shown in FIG. 1) and has an OS 102 and a WCS 104, as illustrated in FIG. 4.

Preferably, each of the layers 132, 134 and 136 of the glove 130 are manufactured such that the layers 132, 134 and 136 are different colors, have a different visual appearance or are otherwise distinguishable from each other. For example, the outermost layer 132, and therefore, the outside surface (OS) 102 of the glove 130 can be a first color or pattern 140, the middle layer 134 can be a second color or pattern 142, and the innermost layer 136, and therefore, the inside surface or wearer contacting surface (WCS) 104 of the glove 130 can be a third color or pattern 144, such that each of the colors and/or patterns 140, 142 and 144 are sufficiently visually distinguishable from each other.

Accordingly, and as described with respect to the glove 110, the layers 132, 134 and 136 of the glove 130 can be manufactured in any color or pattern known to those skilled in the art, provided each of the layers 132, 134 and 136 of the glove 130 comprise different colors and/or are otherwise visually distinct or appear readily distinguishable from each other. For example, the outermost layer 132 can be blue, the middle layer 134 can be beige and the innermost layer 136 of the glove 130 can be white so that a prospective user can readily determine that the glove 110 is a multilayer glove (as shown, for example, in FIG. 1).

Figure 5A:
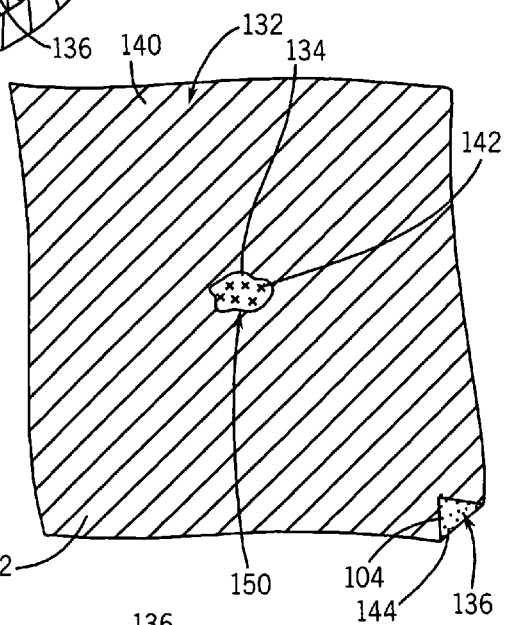
FIG. 5A is a partial view of a portion of the glove illustrated in FIG. 4, showing the color of the middle layer through the leak in the outside layer.
Figure 5B:
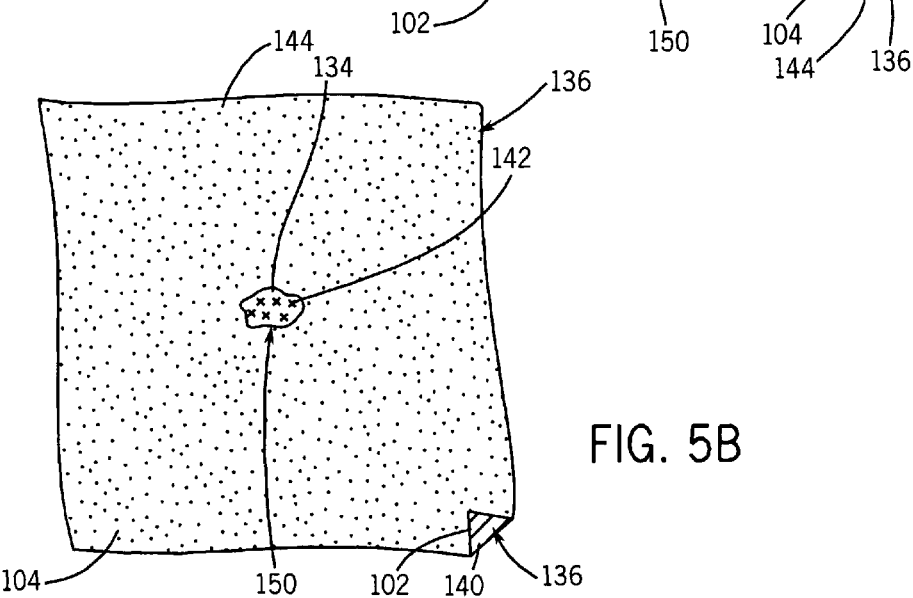
FIG. 5B is a partial view of a portion of the glove illustrated in FIG. 4, showing the color of the middle layer through the leak in the innermost layer.

As best illustrated in FIGS. 5A and 5B, if a pinhole leak, tear or other hole 150 is present in the outermost layer 132 (as shown in FIG. 5A) or present in the innermost layer 136 (as shown in FIG. 5B), the middle layer 134 remains intact (i.e. reduced likelihood of tear propagation and/or a pinhole located in exactly the same location causing a small channel or tunnel through the entire glove).

Where the hole 150 is sufficiently large, the color or pattern 142 of the middle layer 134 can be easily seen through the hole 150, and is readily distinguishable from both the first color or pattern 140 of the outermost layer 132 (FIG. 5A) and the third color or pattern 144 of the innermost layer 136 (FIG. 5B). As such, the distinct and/or distinguishable colors or patterns 140, 142 and 144 of the layers 132, 134 and 136, respectively, can provide the glove 130 with a breach-indicating function that permits easy identification of a ruptured or compromised elastomeric layer and/or glove by the user of the article.

Consistent with the broader aspects of the present invention, as described with reference to the glove 110, the layers 132, 134 and 136 of the glove 130 can comprise more than one color and/or can comprise a colored pattern, indicia or other markings, provided the layers 132, 134 and 136 of the glove 130 are visually distinct and/or readily distinguishable from each other.

As further described with reference to the glove 110, the colorant material/component used to manufacture the different and/or distinguishable colors or patterns 140, 142 and 144 of the layers 132, 134 and 136, respectively, may be any coloring agent known to those skilled in the art. Such colors or patterns 140, 142 and 144 can be provided within or coated on to one or both of the surfaces of the layers 132, 134 and 136, respectively, by any coloring method, mechanism or device known to those skilled in the art.

Similar to the glove 110 described previously, the elastomer(s) for each layer 132, 134, 136 of the glove 130 is preferably selected from the group consisting of a natural rubber latex (originating from either *Havea brasiliensis* and/or guayule (*Parthenium argentatum*)), a synthetic polyisoprene, a chloroprene, a polyurethane, an acrylonitrile, a butadiene methylmethacrylate, a styrene butadiene styrene, a styrene isoprene styrene, a styrene ethylene butylene styrene, a silicone, an acrylate-based hydrogel, a polyvinyl chloride, any other elastomer that can be suspended into an emulsion, any other solvent or plastisol soluble elastomer or any other solvent or plastisol miscible elastomer, and compatible mixtures thereof. Each of the layers 132, 134 and 136 may be manufactured from different types of elastomeric materials, the same or similar elastomeric materials or a combination thereof.

Figure 6:
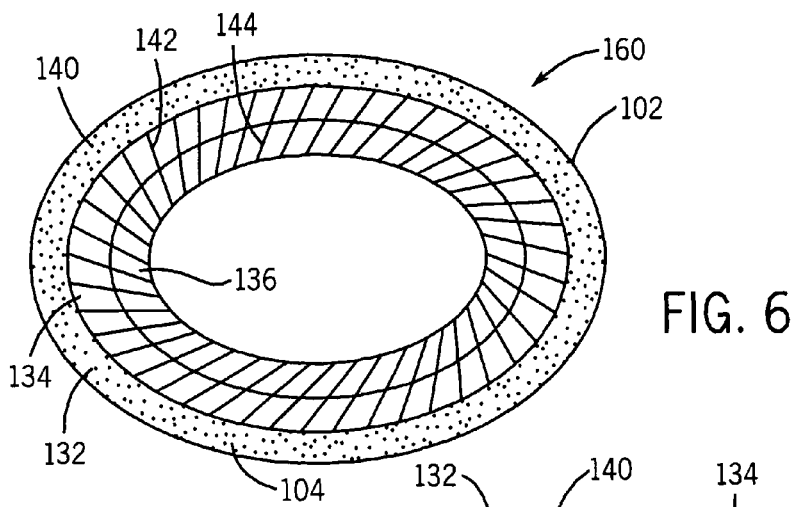
FIG. 6 is a cross sectional view of a portion of a multilayer glove in which the middle and the innermost layers of the multilayer glove comprise a color or pattern that is visually distinct from the outermost layer.

Turning next to FIG. 6, a cross section of a multilayer glove 160 constructed in accordance with the present invention is illustrated. Like the glove 130 illustrated in FIG. 4, the glove 160 has an outermost layer 132; a middle layer 134 and an innermost layer 136. It will be appreciated that the multilayer glove 160 has an exterior appearance similar to glove 100 (shown in FIG. 1) and has an OS 102 and a WCS 104.

As illustrated in FIG. 6, the glove 160 is constructed such that the layers 134 and 136 manufactured of the same or similar color or pattern 142 and 144, respectively, and the layer 132 is manufactured of a color or pattern 140 that is visually distinct from the color or patterns 142 and 144. For example, the middle layer 134, the innermost layer 136 and therefore, the inside surface or wearer contacting surface (WCS) 104 of the glove 160 are constructed of the same and/or visually similar colors or patterns 140 and 144, respectively, and the outermost layer 132, and therefore, the outside surface (OS) 102 is constructed of a color and/or pattern 140 that is sufficiently visually distinct from the patterns 142 and 144.

Accordingly, it will be readily recognized that the glove 160 has an exterior appearance similar to glove 100 (shown in FIG. 1) wherein the OS 102 is manufactured of a color that is visually distinct from the WCS 104—permitting the glove 160 to be readily visually distinguished as a multilayered elastomeric article.

Figure 7:
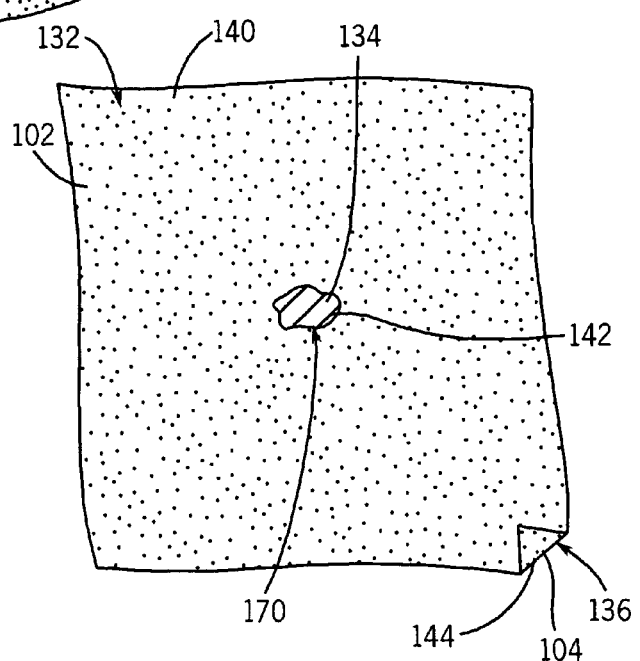
FIG. 7 is a partial view of a portion of the glove illustrated in FIG. 6, showing the color of the middle layer through the leak in the outside layer.

As best illustrated in FIG. 7, if a pinhole leak, tear or other hole 170 is present in the outermost layer 132, the middle layer 134 remains intact (i.e. reduced likelihood of tear propagation and/or a pinhole located in exactly the same location causing a small channel or tunnel through the entire glove).

Where the hole 150 is sufficiently large, the color or pattern 142 of the middle layer 134 may be seen through the hole 170. Accordingly, because the color or pattern 142 appears different and/or can be readily distinguished from the color or pattern 140, the hole 170 may be noticed by the user of the glove, providing the glove 160 with a breach-indicating function that permits identification of a ruptured or compromised elastomeric layer and/or glove by the user of the article.

Figure 8:
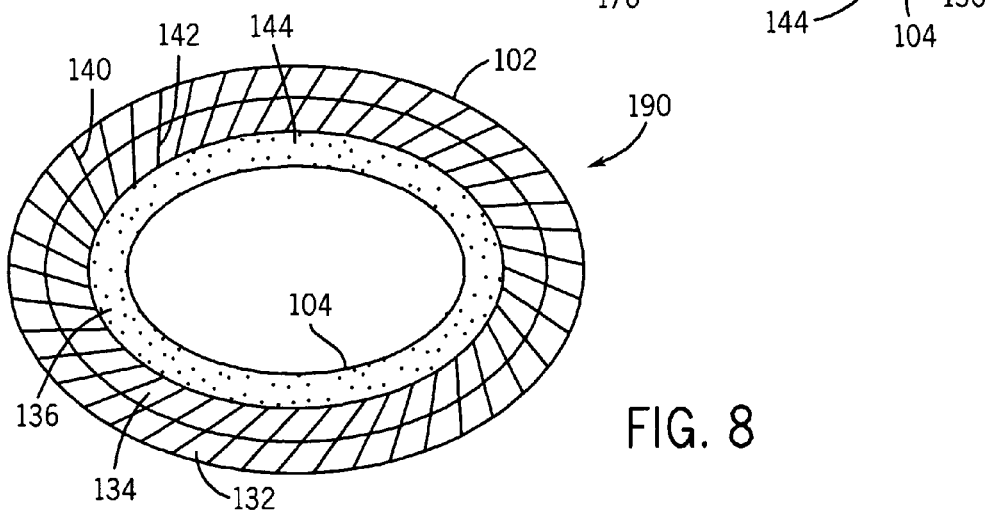
FIG. 8 is a cross sectional view of a portion of a multilayer glove in which the middle and the outermost layers of the multilayer glove comprise a color or pattern that is visually distinct from the innermost layer.

Turning next to FIG. 8, a cross section of a further embodiment of a multilayer glove 190 of the present invention is illustrated. Like the glove 160 illustrated in FIG. 6, the glove 190 has an outermost layer 132; a middle layer 134 and an innermost layer 136. It will be appreciated that the multilayer glove 190 has an exterior appearance similar to glove 100 (shown in FIG. 1) and has an OS 102 and a WCS 104.

As illustrated in FIG. 8, the glove 190 is constructed such that the layers 132 and 134 manufactured of the same or similar color or pattern 140 and 142, respectively, and the layer 136 is manufactured of a color or pattern 144 that is visually distinct from the color or patterns 140 and 142. For example, the outermost layer 132, and therefore, the outside surface (OS) 102 and the middle layer 134 of the glove 190 are constructed of the same and/or visually similar colors or patterns 140 and 142, respectively, and the inside surface or wearer contacting surface (WCS) 104 of the glove 190 constructed of a color and/or pattern 144 that is sufficiently visually distinct from the patterns 140 and 142.

Accordingly, it will be readily recognized that the glove 190 has an exterior appearance similar to glove 100 (shown in FIG. 1) wherein the OS 102 is manufactured of a color and/or pattern that is visually distinct from the WCS 104—permitting the glove 190 to be readily visually distinguished as a multilayered elastomeric article.

As will be readily apparent to those skilled in the art, the multilayered elastomeric articles of the present invention may be constructed of any number of layers of elastomeric material, provided at least one of the layers is provided with a distinguishing color and/or pattern from the remaining layers such that the layer comprising the distinguishing color(s) and/or pattern provides at least one of a indication that the article is a multilayer article. More particularly, and most preferably, the multilayered, multicolored article of the present invention is a bilaminar glove constructed such that the OS and the WCS of the glove is sufficiently visually distinct from each other.

As will be well known to those skilled in the art, the methods of making multicolored, multilayer elastomeric articles of the present invention can utilize any general prior art glove making methods known to those skilled in the art wherein each layer or alternatively, at least one of the layers, is manufactured of a visually distinct color and/or comprises a distinguishing visual appearance (see again, U.S. patent application Ser. Nos. 10/373,970 and 10/373,985, entitled "Flexible elastomer articles and methods of manufacturing", and in U.S. patent application Ser. No. 10/640,192, entitled "Gloves containing dry powdered aloe and method of manufacturing"). Accordingly, the multicolored, multilayered elastomeric articles of the present invention can be manufactured by any method known by those skilled in the art with merely a slight modification to existing processes.

It will be appreciated by those skilled in the art, that any of the described methods and/or any method known to those skilled in the art may be used to incorporate a colorant component/coloring agent into the matrix of the elastomer from which the glove is made and, optionally or alternatively, coat the wearer contacting surface (inside surface) and/or the outside (distal) surface with a colorant material/component, pattern or design.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A multilayer elastomeric article having an outside or distal surface and an inside or wearer contacting surface, the article comprising:
   a first elastomeric layer having a first surface corresponding to the outside surface of the article, the surface bearing at least one first visually identifiable characteristic;
   a second elastomeric layer having a first surface corresponding to the inside surface of the article, the surface bearing at least one second visually identifiable characteristic sufficiently visually distinct from the first visually identifiable characteristic; and
   at least one middle elastomeric layer disposed between the first and the second elastomeric layers having a first surface contiguously bonded to the first elastomeric layer and a second surface contiguously bonded to the second elastomeric layer.

2. The article of claim 1, wherein the article is selected from gloves and condoms.

3. The article of claim 1, wherein at least one layer of the multilayer elastomeric article is selected from a natural rubber latex, synthetic rubber, a plastic, a synthetic polyisoprene, a chloroprene, a polyurethane, an acrylonitrile, a butadiene methylmethacrylate, a styrene butadiene styrene, a styrene isoprene styrene, a styrene ethylene butylene styrene, a silicone, and an acrylate-based hydrogel, a silicone and combinations thereof.

4. The article of claim 1, wherein the first elastomeric layer comprises an elastomeric material having an elastomeric matrix and includes at least one coloring agent within the elastomeric matrix.

5. The article of claim 1, wherein the second elastomeric layer comprises an elastomeric material having an elastomeric matrix and includes at least one coloring agent within the elastomeric matrix.

6. The article of claim 1, wherein at least one of the first elastomeric layer and the second elastomeric layer comprises at least one coloring agent applied to the surface of the layer.

7. The article of claim 1, wherein the article is a glove and wherein first visually identifiable characteristic is a first color.

8. The article of claim 7, wherein the second visually identifiable characteristic is a second color, the second color being sufficiently visually distinct from the first color.

9. The article of claim 1, wherein each of the layers of the multilayer article comprises an elastomeric material having an elastomeric matrix, wherein at least one of the layers comprises a flavor component, an antimicrobial agent, a detackifying agent, a botanical extract, a donning enhancing agent, a therapeutic component and combinations thereof incorporated into the matrix of the elastomeric material.

10. A multilayer elastomeric glove comprising:
    at least two layers of an elastomeric material contiguously bonded together, the at least two layers including a wearer contacting surface and a distal surface, wherein the wearer contacting surface comprises a first color and the distal surface comprises a second color, the first color of the wearer contacting surface being visually distinguishable by the human eye from the second color of the distal surface.

11. The glove of claim 10, wherein one of the wearer contacting surface, the distal surface or both surface further comprise at least one pattern, design or indicia.

12. The glove of claim 10, wherein each of the at least two layers comprises an elastomeric material having an elastomeric matrix and includes at least one coloring agent disposed within the elastomeric matrix thereof.

13. The glove of claim 10, wherein each of the layers of the glove comprises an elastomeric material having an elastomeric matrix, wherein at least one of the layers comprises a flavor component, an antimicrobial agent, a detackifying agent, a botanical extract, a donning enhancing agent, a therapeutic component and combinations thereof incorporated into the matrix of the elastomeric material.

* * * * *